United States Patent
Geiger et al.

(10) Patent No.: US 6,826,821 B2
(45) Date of Patent: Dec. 7, 2004

(54) SYSTEM FOR MACHINING WORK PIECES COMPRISING AT LEAST ONE MACHINE TOOL

(75) Inventors: Dietrich Geiger, Grossbottwar (DE); Wolfgang Horn, Göppingen (DE); Gerhard Stengele, Ludwigsburg (DE)

(73) Assignee: Cross Hüller GmbH, Ludwigsburg (DE)

( * ) Notice: Subject to any disclaimer, the term of this patent is extended or adjusted under 35 U.S.C. 154(b) by 47 days.

(21) Appl. No.: 10/312,822

(22) PCT Filed: Jun. 29, 2001

(86) PCT No.: PCT/EP01/07485
§ 371 (c)(1),
(2), (4) Date: Dec. 26, 2002

(87) PCT Pub. No.: WO02/00388
PCT Pub. Date: Jan. 3, 2002

(65) Prior Publication Data
US 2003/0172510 A1 Sep. 18, 2003

(30) Foreign Application Priority Data
Jun. 29, 2000 (DE) .......................................... 100 31 731

(51) Int. Cl.[7] .............................................. B23P 23/06
(52) U.S. Cl. ......................... 29/563; 29/33 P; 409/158; 409/159; 409/137; 198/346.2; 198/345.3
(58) Field of Search .......................... 483/15; 29/33 P, 29/563; 409/172, 158–159, 137; 198/346.1, 346.2, 346.3, 345.3

(56) References Cited

U.S. PATENT DOCUMENTS

| | | | | |
|---|---|---|---|---|
| RE26,770 E | * | 1/1970 | Lemelson | 29/33 P |
| 3,587,390 A | * | 6/1971 | Lohneis | 409/221 |
| 4,090,287 A | * | 5/1978 | Selander | 29/563 |
| 4,423,806 A | * | 1/1984 | Ogasawara | 198/346.1 |
| 4,566,837 A | * | 1/1986 | Shiomi et al. | 198/346.1 |
| 4,747,193 A | * | 5/1988 | Hashidate et al. | 29/33 P |
| 4,809,422 A | | 3/1989 | Kitamura | |
| 5,062,195 A | | 11/1991 | Binder | |
| 5,172,464 A | * | 12/1992 | Kitamura et al. | 29/563 |
| 5,321,874 A | * | 6/1994 | Mills et al. | 29/33 P |
| 5,439,431 A | * | 8/1995 | Hessbruggen et al. | 483/14 |
| 5,538,373 A | * | 7/1996 | Kirkham | 409/131 |
| 5,781,983 A | * | 7/1998 | Gruner | 29/563 |
| 5,819,395 A | * | 10/1998 | Faitel | 29/33 P |

FOREIGN PATENT DOCUMENTS

| | | |
|---|---|---|
| AT | PS 288112 | 2/1971 |
| DE | 31 34 833 | 6/1982 |
| DE | 299 20 910 | 2/1990 |
| DE | 39 25 568 | 2/1991 |
| DE | 44 22 416 | 1/1996 |
| DE | 197 56 278 | 7/1999 |
| GB | 2229658 A * | 10/1990 |

OTHER PUBLICATIONS

Gurychev, "Metal Cutting Machine Tools: Determining the Configuration of a Machining Centre", 1983, Stank Instrument, vol. 54, Issue 2, pp. 4–6.*

* cited by examiner

Primary Examiner—Erica Cadugan
(74) Attorney, Agent, or Firm—McGlew and Tuttle, P.C.

(57) ABSTRACT

An installation for machining work pieces (15) comprises at least a machine tool (36). It is provided with a supply and take-down equipment (41), which is disposed before the machine tool (36) on a side of the working area (14) that faces away from the work spindle (10).

49 Claims, 12 Drawing Sheets

SYSTEM FOR MACHINING WORK PIECES COMPRISING AT LEAST ONE MACHINE TOOL

FIELD OF THE INVENTION

The invention relates to an installation for machining work pieces with at least one machine tool which has a machine bed, a frame joined to the machine bed, a work spindle. A work spindle motion unit is disposed on the frame for moving the work spindle on a plane spanned by a vertical y direction. The work spindle is designed for holding a tool which extends perpendicular to the plane in a z direction. A working area is arranged on the machine bed before the work spindle in the z direction. A work piece holding means includes chucking devices for a work niece is arranged in the working area. At least one supply and take-down equipment is also provided.

In machine tools of the generic type known from EP 0 742 072 B1 (corresponding to U.S. Pat. No. 5,662,568 A) and EP 0 916 446 A1 (corresponding to U.S. Ser. No. 09/161 891) now U.S. Pat. No. 6,328,575, the supply of work pieces for machining takes place in a way not described in detail. Customarily, the supply takes place laterally or from above into the working area.

DE 43 24 575 A1 (corresponding to U.S. Pat. No. 5,321,874) teaches to link successive machine tools to one another in such a way that a conveyor path is disposed above the machine tools and above the work holding fixtures that are in front thereof; horizontal carriages are displaceable on the conveyor path, having vertically movable holder beams, each bottom end of which being provided with work piece-transfer means in the form of grippers, which place the work pieces from above on the stationary work holding fixtures that belong to the machine tool, and lift them off upwards after working. The space requirements of such a design are extraordinary.

AT-PS 288 112 teaches an installation for machining work pieces that comprises several successive machine tools. A carriage is disposed for displacement on rails that are disposed on the floor in front of the machine tools. The carriage has forks in the way of a fork lift, by means of which to convey palletized work pieces from a supply rack to the respective machine tool. The pallets are inserted laterally into the working area of the machine tool, after which they are deposited vertically. This design too is rather complicated constructionally; it requires a lot of space and is accompanied with rather time-consuming supply and take-down jobs.

DE 195 16 849 C2 (corresponding to U.S. Pat. No. 6,135,696) teaches to interlink side-by-side machine tools so that work pieces are supplied from below to the machine tools. This offers the possibility of compact structure with reduced moving masses and short supply and take-down times, however, chips and cooling lubricants will drop from the machining place towards the supply and take-down equipment, the protection of which from cooling lubricants and chips not being possible or implying vast constructional requirements. Complicated motions of the work piece grippers of the supply and take-down equipment are necessary to reach the work holding fixtures of the machine tool.

SUMMARY AND OBJECTS OF THE INVENTION

It is an object of the invention to embody an installation of the generic type such that supply and take-down jobs are possible without costly constructional implementation and at reduced supply and take-down times, accompanied with high operational safety.

This object is attained by the supply and take-down equipment being arranged before the machine tool, in the z direction, before the side of the working area that faces away from the work spindle. Disposed before the machine tool is a conveyor path which runs substantially in the x direction and on which the supply and take-down equipment is displaceably supported. The supply and take-down equipment has at least a work piece transfer means. The work piece transfer means and/or the work piece holding means is displaceable in the z direction for transfer of a work piece from the work piece transfer means to the work piece holding means and vice versa. The measures according to the invention render the installation according to the invention very compact, meaning a reduction in moving masses and in the supply and take-down motions of the work piece transfer means. This arrangement ensures that only very few cooling lubricants and chips will move from the working area to the supply and take-down equipment. Transfer from the supply and take-down equipment to the work holding means of the machine tool and vice versa takes place exclusively by horizontal motions of the work holding means and/or the work transfer means, both being preferable equiaxed.

Embodiments according to the claims lead to further simplification of the supply and take-down equipment, highly simply designs of the z-displacement means, measures used for interlinking several machine tools, favorable adaption to differing work pieces, enabling a work to be seized and released rapidly, promoting the reduction of supply and take-down times.

In keeping with a further embodiment, a first work piece transfer means serves for holding a work that has been machined by the machine tool, while another work piece transfer means serves for feeding a work that is to be machined, which further reduces supply and takedown times.

In another embodiment, a work piece can be chucked in successive machine tools in positions that are twisted one relative to the other. Furthermore, a work piece can be rotated, for instance after machining, so that chips and/or coolant are removed.

In further embodiments the side of the machine tools, serves for rapid conveyance of the work piece from the place of transfer to the place of machining and possibly for handling at the place of machining.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
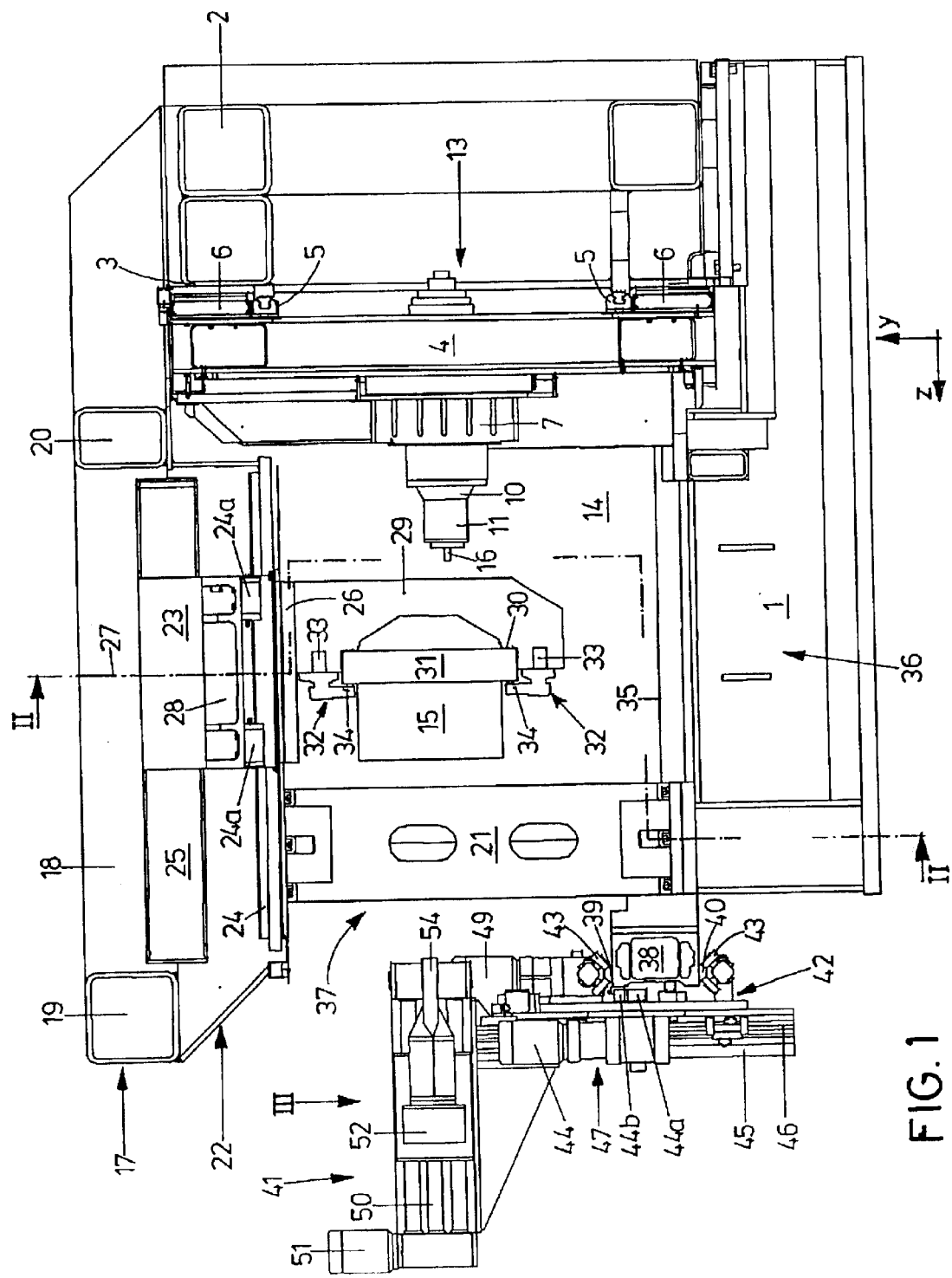
FIG. 1 is a side view of a machine tool with a supply and take-down equipment.
Figure 2:
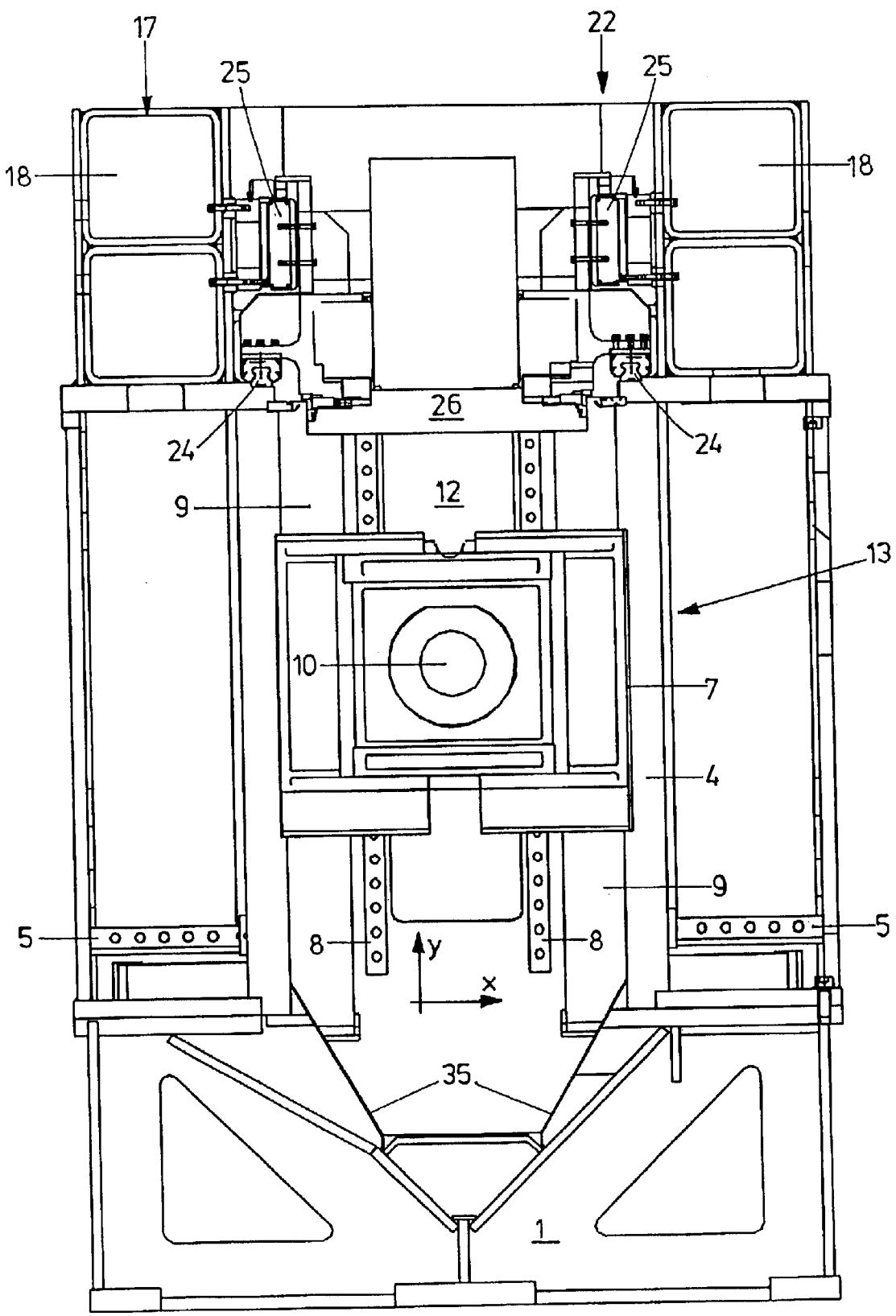
FIG. 2 is an elevation, on the line II—II of FIG. 1, of the machine tool according to FIG. 1.

As seen in particular in FIGS. 1 and 2, a frame 2 is mounted on a machine bed 1. Mounted on a front 3 of the frame 2 is an x skid 4 for horizontal displacement in an x direction on x guides 5. Actuation takes place by means of x linear motors 6. Mounted on the x skid 4 is a y skid 7 for vertical displacement in the y direction on y guides 8. Actuation takes place by means of y linear motors 9. Disposed on the y skid 7 is a work spindle 10, which is rotatably drivable by a motor (not shown) and has a tool holding fixture 11 on its end that faces away from the frame 2. The work spindle 10 extends in the direction towards the frame 2 through an opening 12 in the x skid 4 between the y guides 8 and reaches into the frame 2. The work spindle 10 extends in a z direction perpendicular to a vertical plane spanned by the x direction and the y direction. The work spindle motion unit 13 in the form of a cross-skid, which has been described so far, has a basic structure that is generally known as a box-in-a-box mode of construction and has been illustrated for instance in EP 0 742 072 B1 (corresponding to U.S. Pat. No. 5,662,568 A). By alternative displaceability of the work spindle on the x-y plane may also be effected by couplers as known from EP 0 916 446 A1 (corresponding to U.S. Ser. No. 09/161 891).

Located in front of the tool holding fixture 11 and the work spindle 10 is a working area 14, where a work piece 15 is machined by a tool 16 that is held in the tool holding fixture 11. Arranged above this working area 14 is a top frame 17, which is composed of longitudinal beams 18 that run in the z direction and crossbeams 19, 20 that run in the x direction, and which, at its end turned away from the frame 2, supports itself via props 21 on the machine bed 1. Big advantages are offered by this rather rigid overall construction of a machine frame 22 which comprises the machine bed 1, the frame 2, the top frame 17 and the props 21. This machine frame 22 defines the working area 14.

A z skid 23, which is movable in the z direction, is led on z guides 24 by means of guide shoes 24a for displacement between the longitudinal beams 18 of the top frame 17. Actuation takes place by z linear motors 25. By alternative, actuation in the x, y and z direction may also be effected by rotary motors, for instance electric motors, via ball bearing spindles.

Attached to the underside of the z skid 23 is a work piece turntable 26 which is mounted for rotary actuation about its vertical, y-directed center line 27 by a turntable drive motor 28. Attached to the underside of the turntable 26 are work piece holding means in the form a work holding fixture 29 with a recess 30 that is suited to a fitting piece 31 substantially in the form of a plate that bears the work piece 15. The holding fixture 29 further comprises holding-fixture chucking devices 32 which are actuated by chucking actuators 33. By means of jaws 34, the chucking devices 32 retain the fitting piece 31 in the recess 30 of the holding fixture 29, whereby the work piece 15, which is mounted in a precisely defined position on the fitting piece 31, obtains a precisely defined position relative to the holding fixture 29 and thus to the turntable 26.

The chucking devices 32 are located above and underneath the recess 30, holding the fitting piece 31 in its top and bottom area. As seen in particular in FIG. 1, the work piece 15, in each position of the z skid 23 and in each position of rotation of the turntable 26, projects over the entire working area 14 into a position free from the work holding fixture 29. Located underneath the work piece 15 is a chip removal arrangement 35 in the form of chip clearances.

Figure 3:
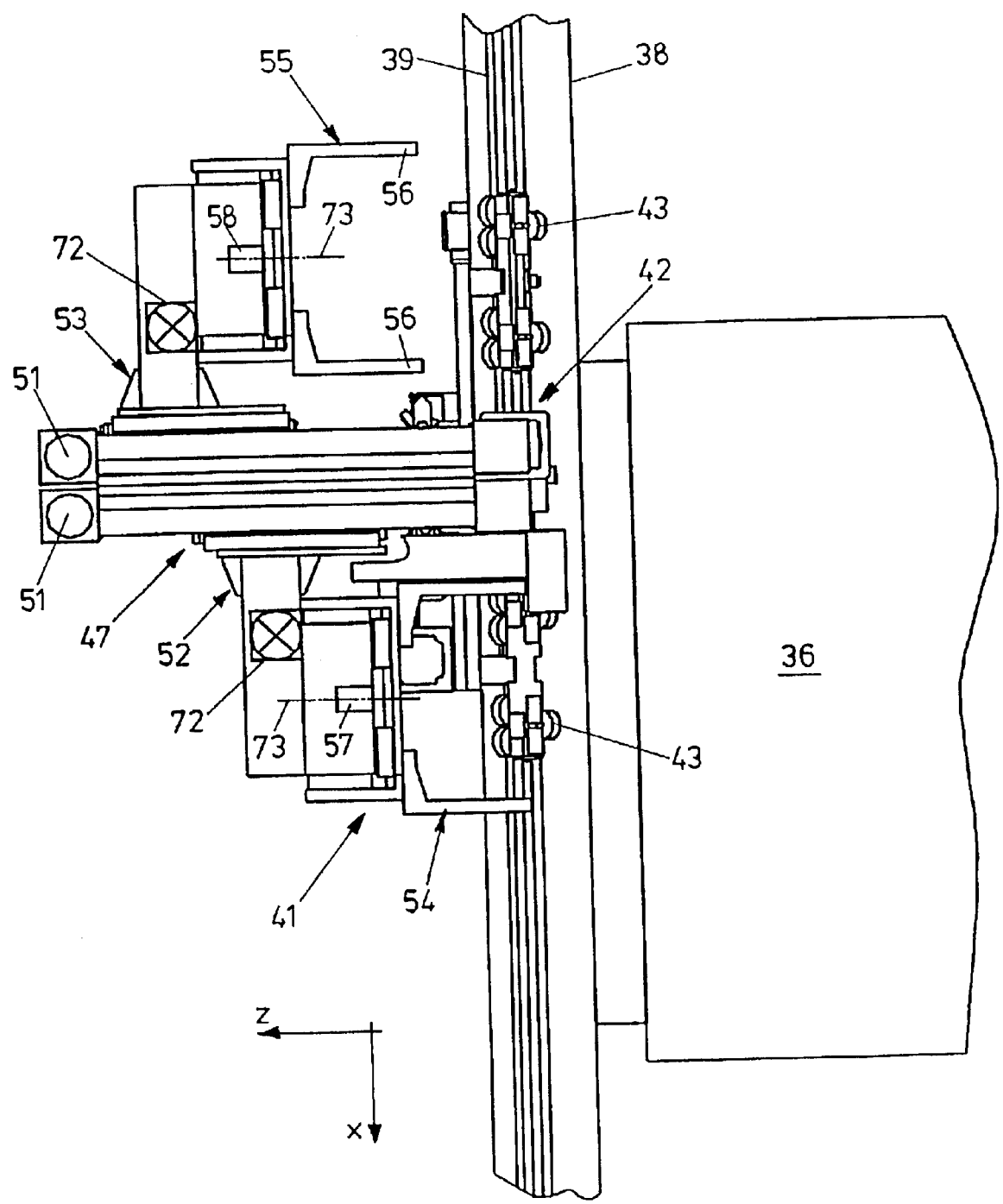
FIG. 3 is a plan view of the supply and take-down equipment in accordance with the arrow III of FIG. 1.

Of the machine tools 36 specified so far, several machine tools 36a to 36f (see FIG. 4) of fundamentally identical design are provided side by side in a row in the x direction, serving for various jobs of machining one and the same work piece 15; they are interlinked, constituting a flexible manufacturing system. FIG. 3 illustrates only two machine tools 36a, 36b of them.

On the supply and take-down side 37, which is allocated to the props 21 and, therefore, located on the side of the machine tools 36a to 36f opposite the work spindle motion unit 13, provision is made for a conveyor path 38 which interconnects the machines 36a to 36f and is fixed to the machine frames 22, in particular to the respective machine bed 1. The conveyor path 38 comprises a top and a bottom Vee guide 39, 40, on which a supply and take-down equipment 41 is guided for displacement in the x direction. It has a horizontal carriage 42 as an x skid which is led on guides 39, 40 for displacement free from floating and tilting by means of rolls 43 that are spaced apart in the x direction. Actuation takes place by an x electric motor 44 in the form of a gear motor by way of a gear 44a and a pinion 44b or, alternatively, by way of a synchronous belt drive. By alternative, actuation may also take place by a linear motor, in particular by a long-stator linear drive.

The carriage 42 has a vertical beam 45, which extends in the y direction and on which a y skid 47 is disposed for vertical displacement in the y direction by means of y guides 46. Actuation takes place by means of a y electric motor 49. The y carriage 47, which extends substantially horizontally in the z direction, has two z rails 50, on each of which is guided a z skid 52 and 53 for displacement in the z direction as z-displacement means; the z skid 52 and 53 is drivable by a z electric motor 51.

The z skids 52, 53, which stand out from the y skid 47 in the x direction, are provided with work piece grippers 54 and 55 as work piece transfer means; the grippers 54 and 55 are oriented in the z direction towards the working area 14 and equipped with gripping jaws 56, each of which being opened and closed by a gripping-jaw drive 57 and 58. The work piece grippers 54, 55 are jointly displaceable in the y direction and independently displaceable in the z direction; they can be opened and closed independently of each other. In the x direction, they take a given fixed position relative to one another on the beam 45 of the carriage 42. Furthermore, a rotary actuator 54a and 55a is provided in each case, by means of which the respective gripper 54 and 55 is pivotable about its center line 54b and 55b which runs in the z direction.

The mode of operation is explained in conjunction with FIGS. 1 to 3 and FIGS. 4 to 7, which are strongly simplified as compared to the design according to FIGS. 1 to 3. This is why structural components which are strongly simplified as compared to FIGS. 1 to 3 have the same reference numerals as in FIGS. 1 to 3, however provided with a prime.

Figure 4:
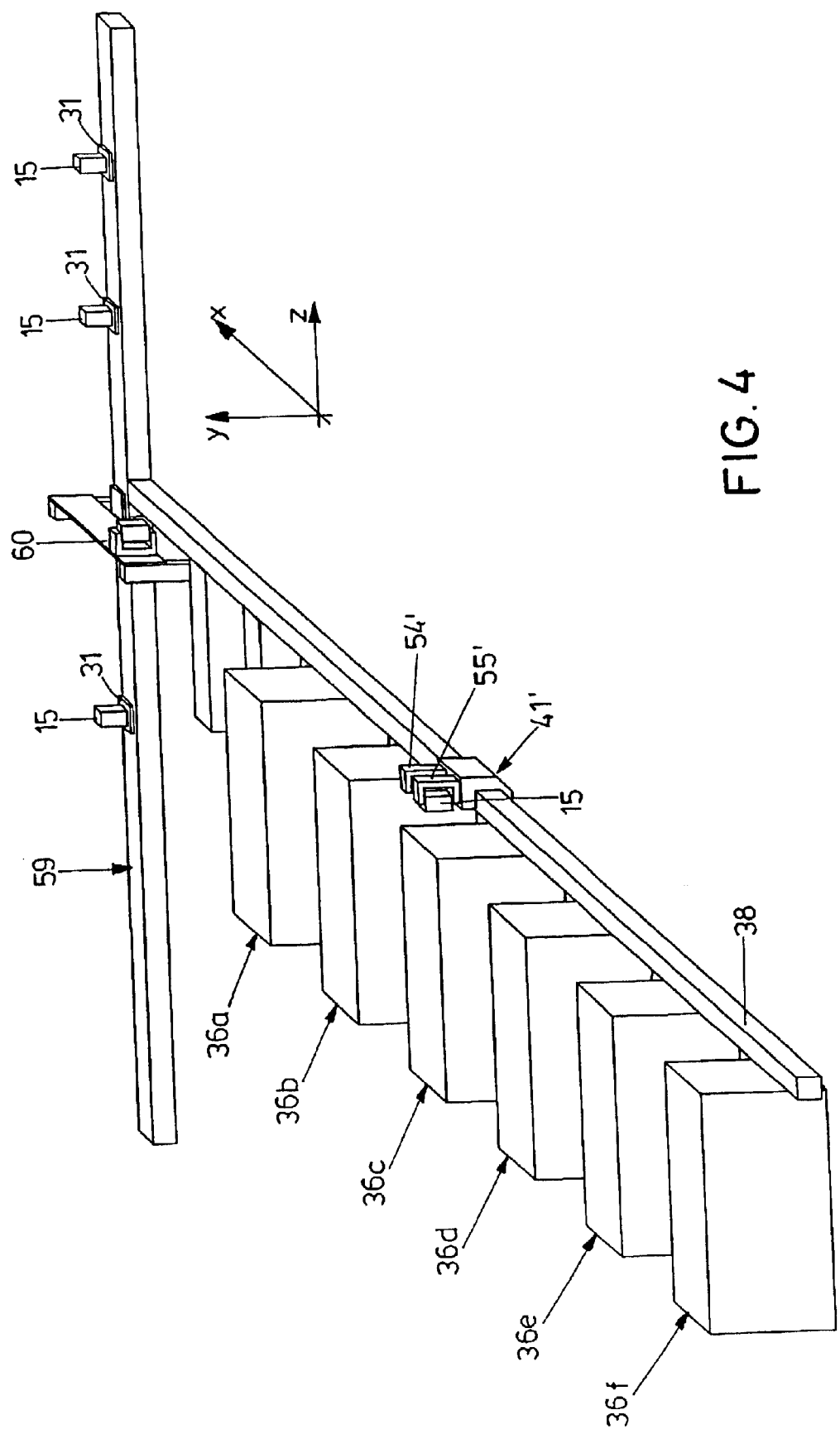
FIG. 4 is a perspective plan view of a diagrammatic illustration of an installation comprising several machine tools and a supply and takedown equipment.

As seen from the above-mentioned FIG. 4, a greater number of machine tools 36a to 36f are linked together by the conveyor path 38, along which the supply and take-down equipment 41' is movable in the x direction. Upstream of the conveyor path 38 is a feed and discharge equipment 59, for instance in the form of a conveyor belt, on which work pieces 15 that are to be machined are supplied, for example sitting on the fitting pieces 31, and on which finished work pieces 15 are discharged together with their fitting pieces 31. For placement of the work pieces 15 from the feed and discharge equipment 59 on to the supply and take-down equipment 41, and from there again on to the feed and discharge equipment 59, provision is made for a transfer equipment 60 at a place where the conveyor path 38 and the feed and discharge equipment 59 meet.

Figure 5:
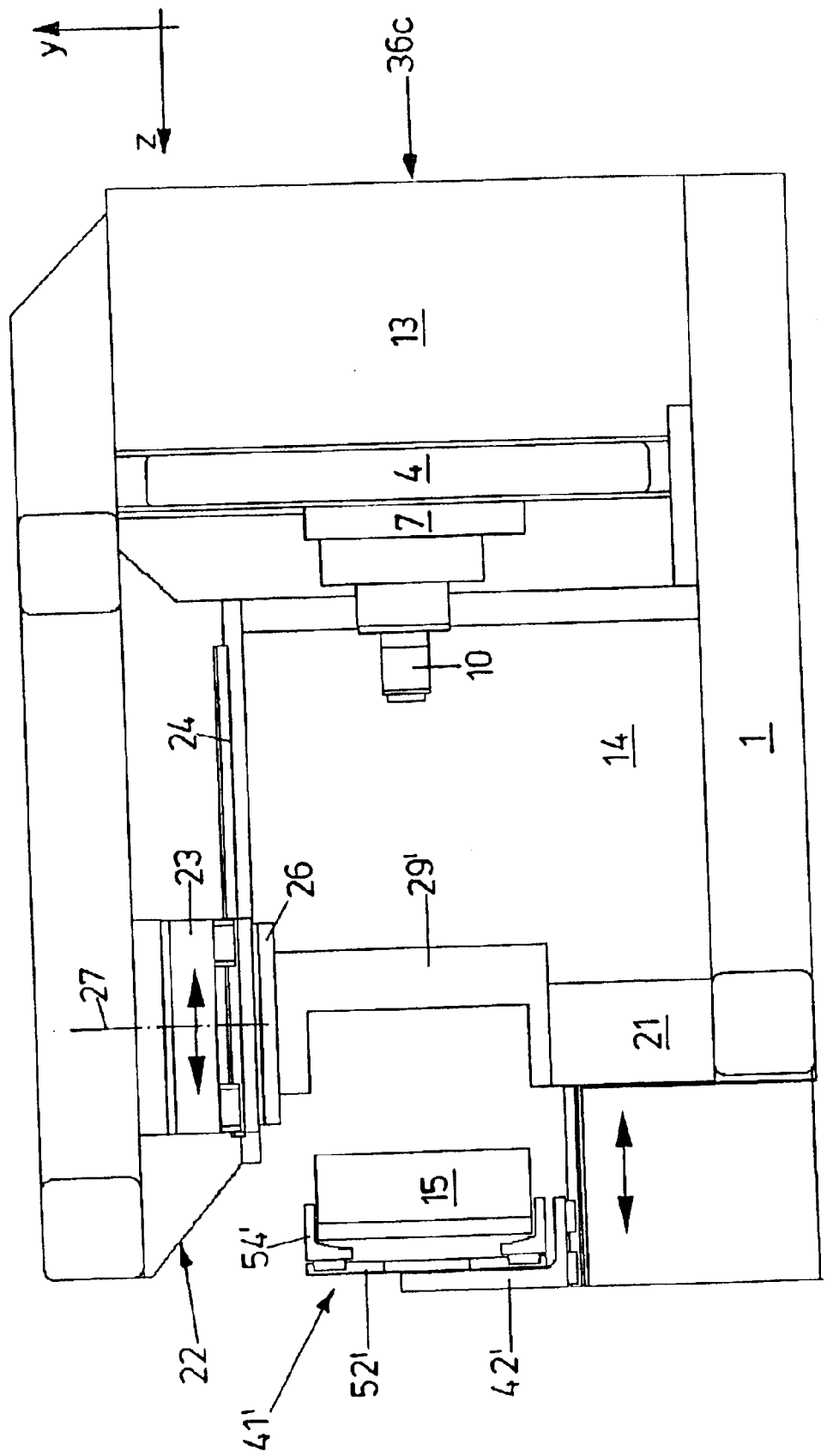
FIGS. 5 to 7 are strongly diagrammatic side views of a machine tool comprising a supply and take-down equipment, with the work piece transfer means and the work piece-holding means in varying positions.
Figure 6:
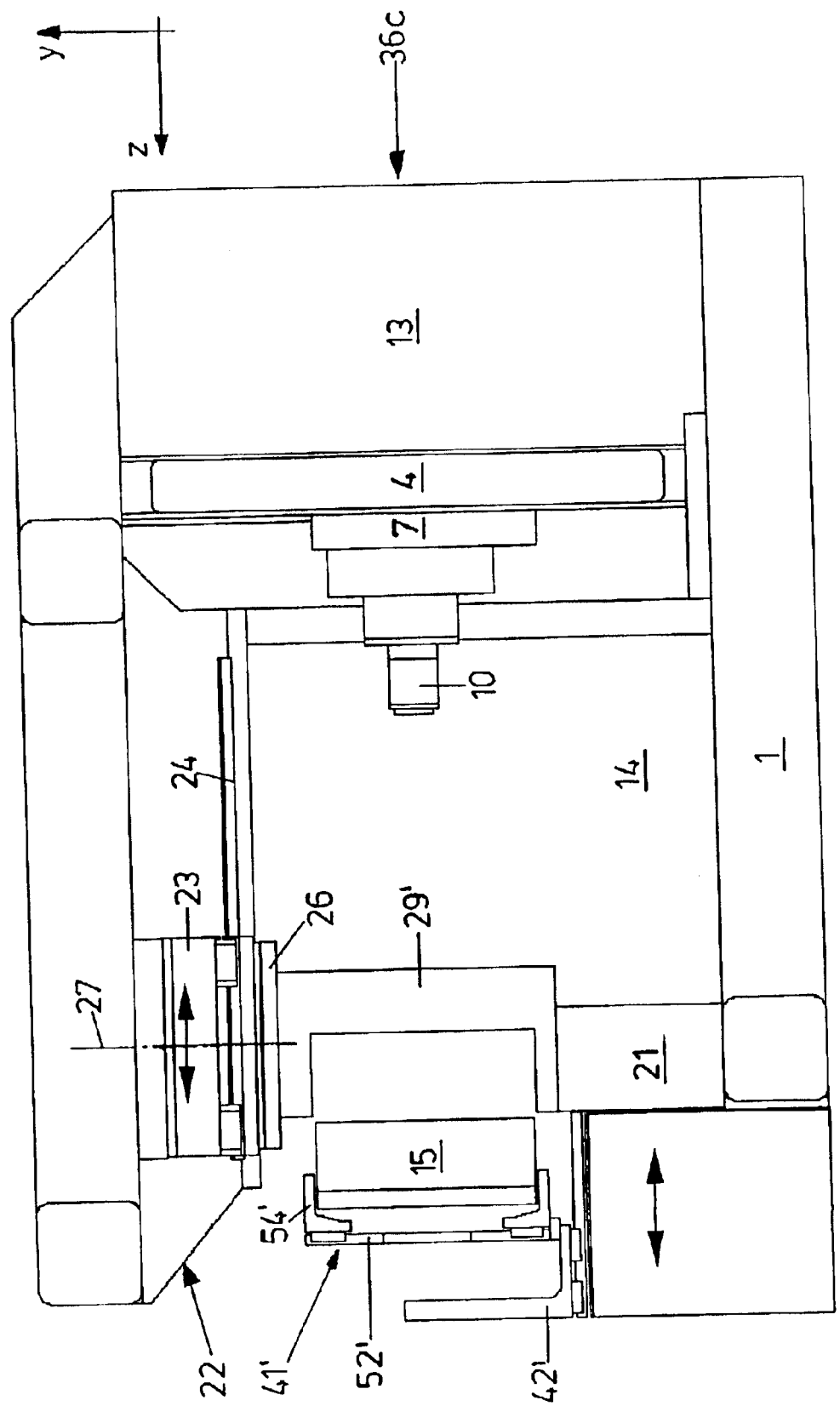
Figure 7:
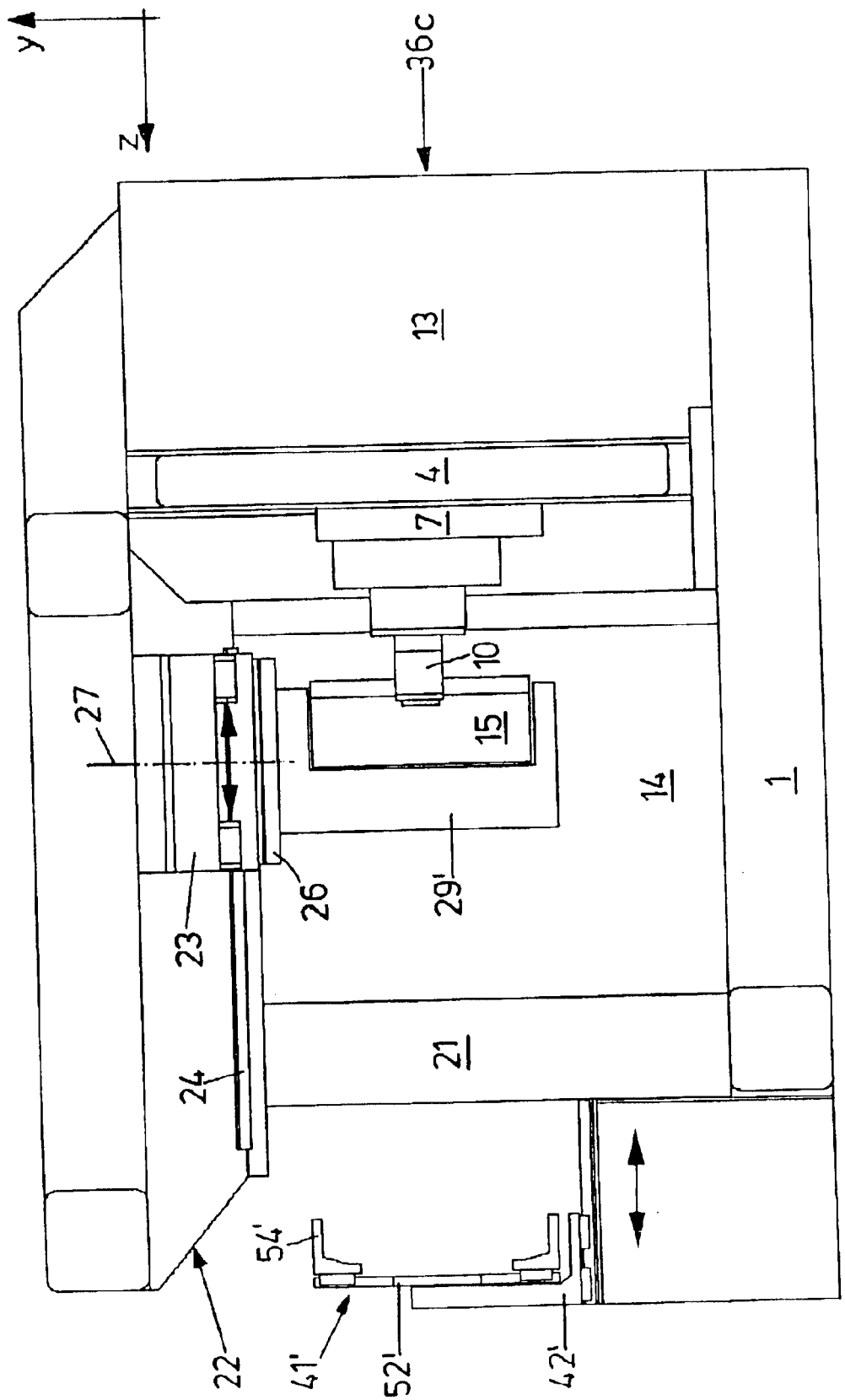
Figure 8:
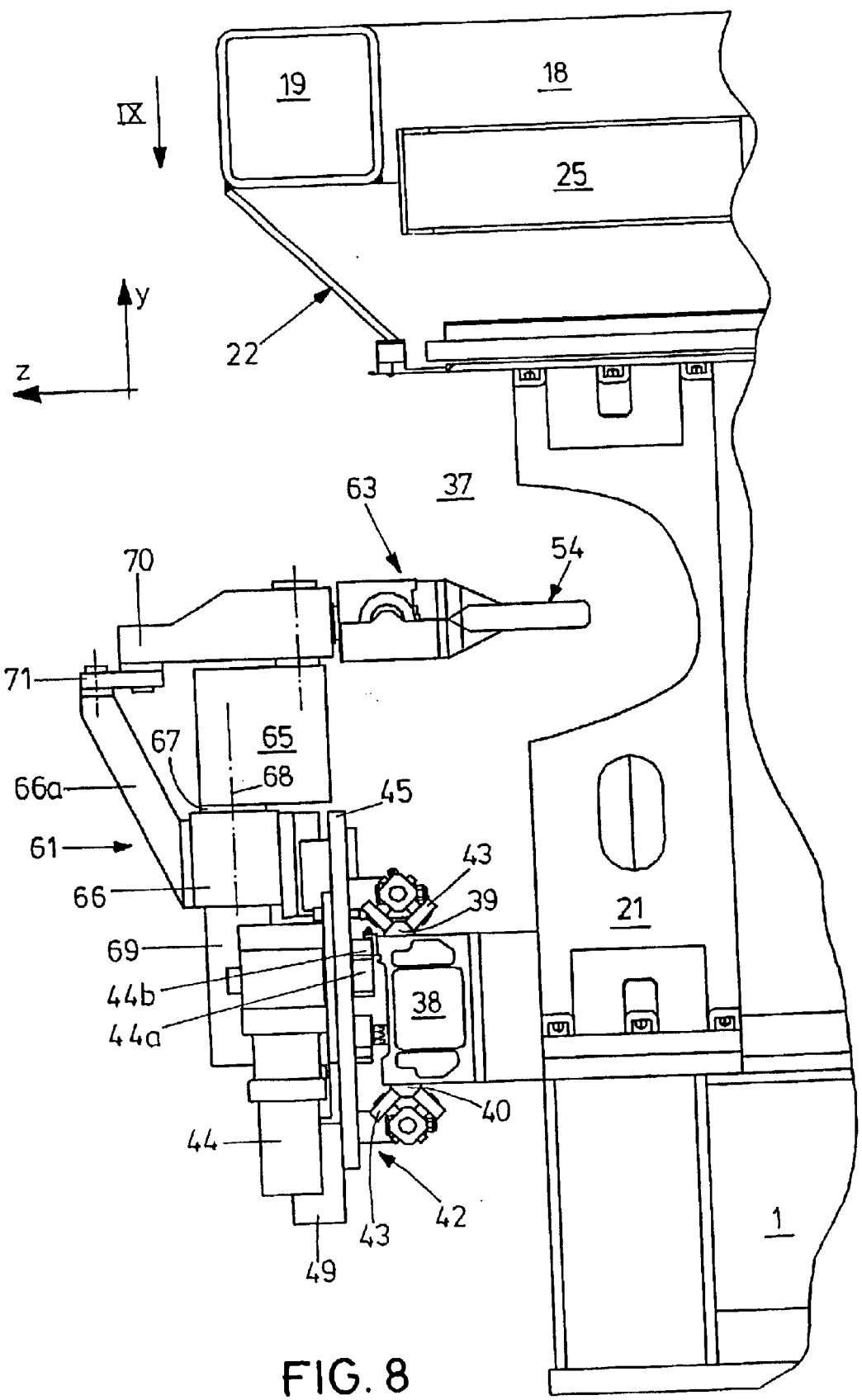
FIG. 8 is a lateral view of a part of the machine tool, comprising a modified embodiment of a supply and take-down equipment.
Figure 9:
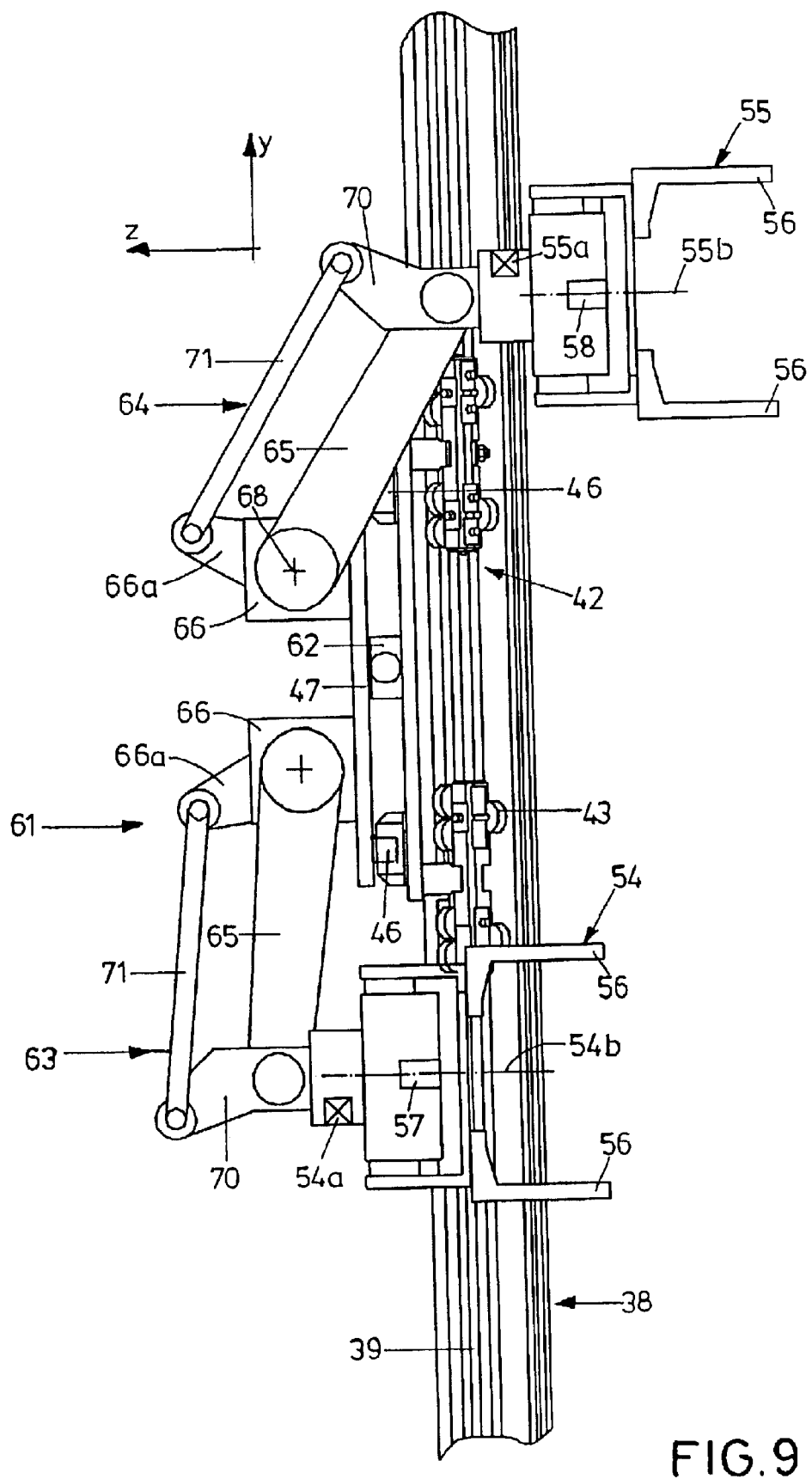
FIG. 9 is a plan view of the supply and take-down equipment in accordance with the arrow IX of FIG. 8.

If a machined work piece 15 is in the work holding fixture 29'—which will presumably be so during a conventional manufacturing process—then the work piece turntable 26 and the work holding fixture 29' are in the transfer position seen in FIGS. 1, 5 and 6, which is in vicinity to the supply and takedown equipment 41'. In this position, the turntable 26 is pivoted such that the work piece 15 (not shown in this position in FIGS. 5 and 6) is turned towards the equipment 41'. By corresponding displacement in the y and z direction, the gripper 54', which holds no work piece 15, can seize the work piece 15 by the gripping jaws 56 being closed and remove it from the holding fixture 29' after release of the chucking jaws 34. The gripper 54' is then run in the z direction out of the machine tool 36c. Afterwards the horizontal carriage 42 is moved in the x direction and the work piece gripper 55' in the y direction sufficiently far for the work piece 15, which is seized thereby and still remains to be machined, to move before the work holding fixture 29', which is still in the transfer position, as seen in FIG. 5.

Then the z skid 53', which holds the work piece 15 that is to be machined, and the gripper 55' are moved from the x conveying position seen in FIG. 5 towards the work holding fixture 29', corresponding to FIG. 6, to such an extent that the holding fixture 29' can take up the work piece 15 as illustrated in FIGS. 1 to 3 and as specified above. When the chucking devices 32 have been closed, the gripping jaws 56 open so that the work piece 15 is exclusively held in the work piece holding fixture 29'. The z skid 23 is then moved in the z direction towards the tool 16, the work piece 15 being simultaneously pivoted about the axis 27. In the position seen in FIG. 7, it is machined. The motions of the tool 16 and the work piece 15 relative to one another are performed by the x skid 4, the y skid 7, the z skid 23 and the turntable 26.

Return transfer of the machined work piece 15 then takes place in the way described, by displacement of the z skid 23 and by rotation of the work piece turntable 26 into the position of transfer.

Machining takes place in each machine tool 36a to 36f. For all machines to be able to operate simultaneously, one or several supply and take-down equipments are provided on the conveyor path 38.

FIGS. 8 to 12 illustrate a modified embodiment of a supply and take-down equipment 61. In as much as parts are available, which are identical or nearly identical with those of FIGS. 1 to 4, they have the same reference numerals, there being no need of renewed description.

The y skid 47 of the supply and take-down equipment 61 is vertically drivable by the y electric motor 49 by way of a ball-bearing spindle drive 62. For displacement of the work piece grippers 54 and 55 that serve as work piece transfer means, it comprises parallel bars as z-displacement means 63, 64. They have a main pivoted lever 65 which is lodged in a pivot bearing 67 on a gear box 66 that is fixed to the y skid 47, pivoting about a vertical pivot axis 68 that runs in the y direction. Pivoting takes place by means of an electric z pivot-drive motor 69 which is flanged to the gear box 66. By its end opposite the pivot bearing 67, each main pivoted lever 65 is connected with a holder 70 which holds the respective work piece grippers 54 and 55. In parallel to the main pivoted lever 65, provision is made for a parallel-motion lever 71, which is articulated to a bracket 66a that is mounted on the box 66 and to the holder 70 so that the respective holder 70, together with the gripper 54 and 55, is moved in parallel to itself upon swings of the main pivoted lever 65. A rotary drive 54a and 55a is mounted on the holder 70, by means of which to pivot the respective gripper 54 and 55 about its center line 54b and 55b that runs in the z direction.

Figure 10:
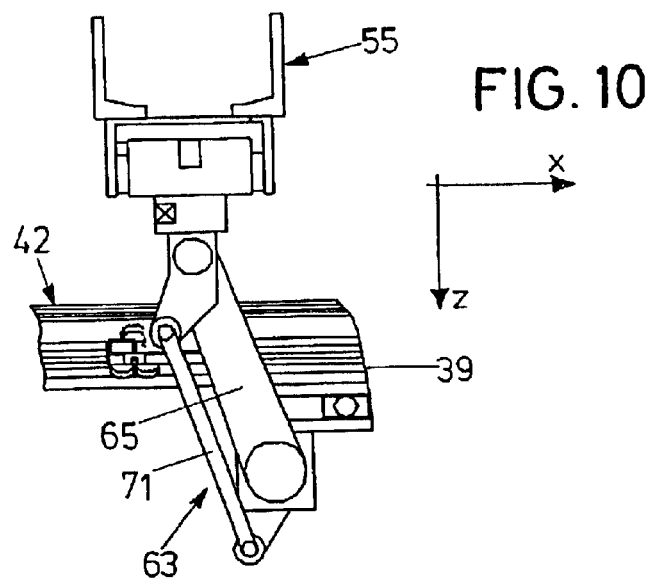
FIGS. 10 to 12 are partial plan views of the supply and take-down equipment in varying positions of the work piece grippers thereof.
Figure 11:
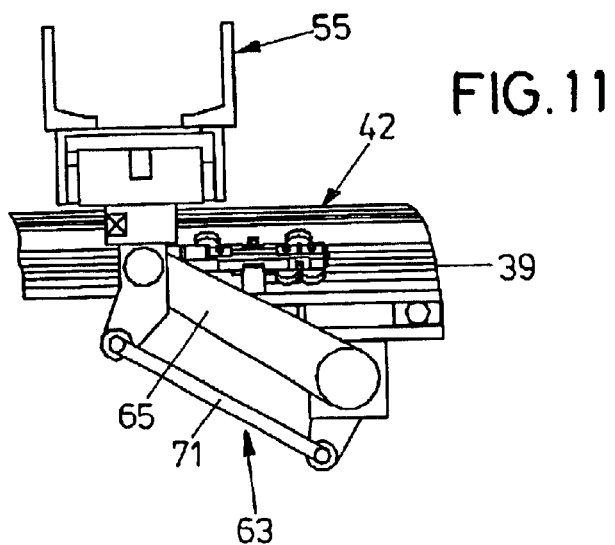
Figure 12:
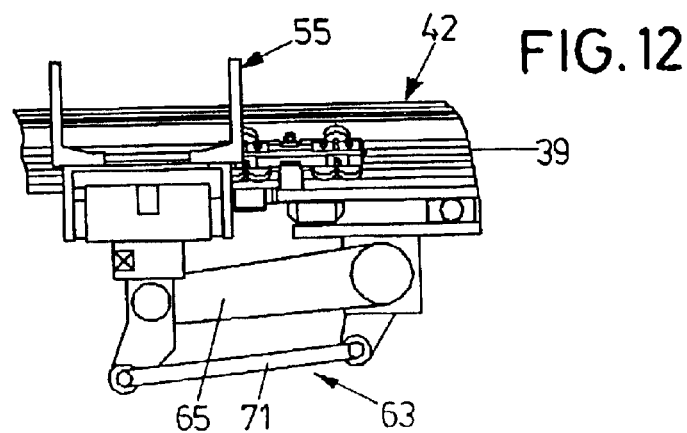

The partial illustrations in FIGS. 10 to 12 show that whenever the work piece grippers 54 or 55 are to be shifted not only parallel to themselves, but straightly in the z direction, the horizontal carriage 42 must be moved in the x direction, depending on the position of pivoting of the pivoted lever 65 together with the parallel-motion lever 71. The mentioned straight displacement of the grippers 54, 55 is produced by a superposed motion of the z-displacement means 63 and of the horizontal carriages 42. For clarification purposes, the work piece grippers 55 are shown one precisely on top of the other in FIGS. 10, 11 and 12 so that it is recognizable in which way the horizontal carriage 42 must be moved in the x direction for straight motion of the grippers 55 to be obtained. Otherwise, the procedure is as described above.

Figure 13:
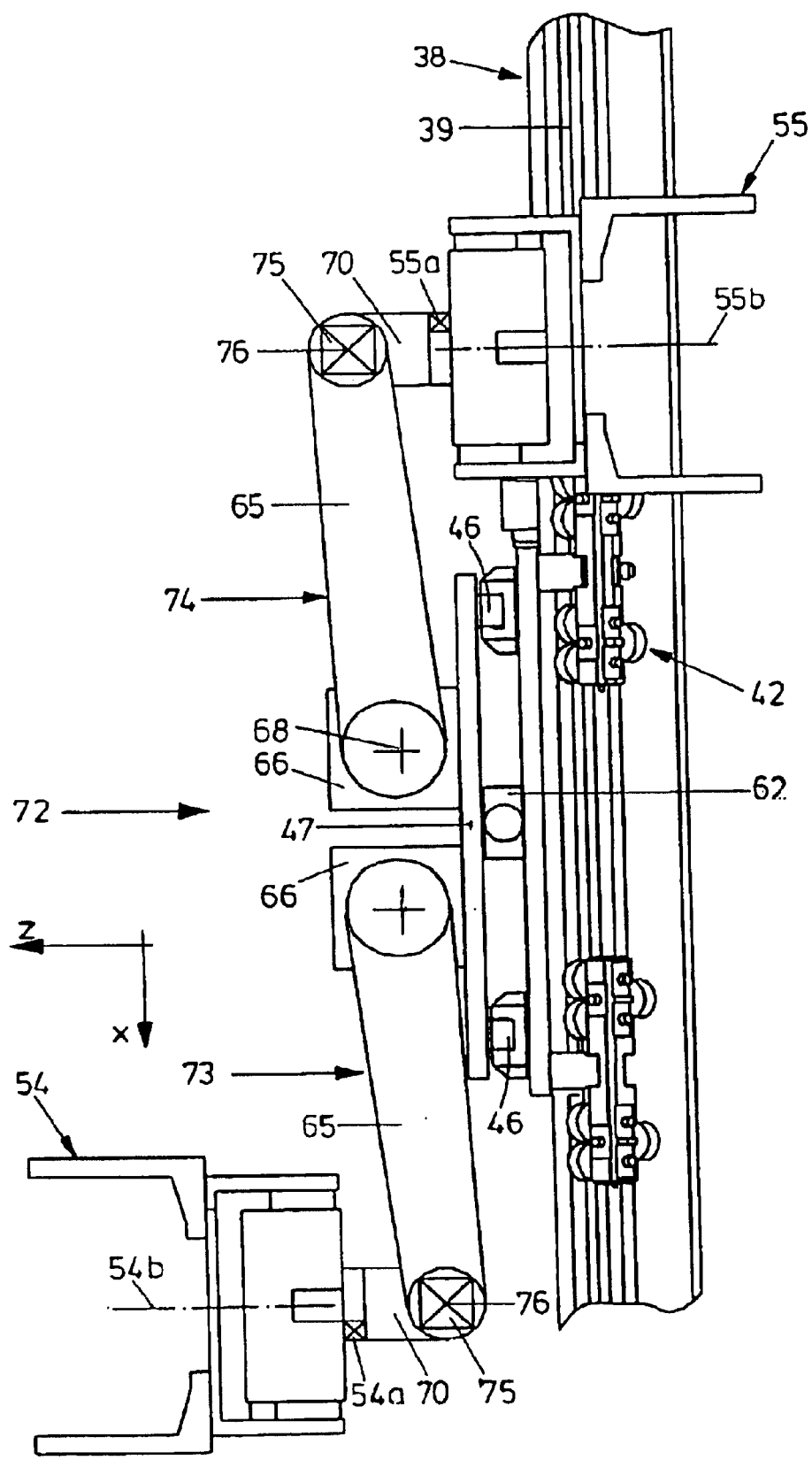
FIG. 13 is a plan view of another embodiment of a supply and take-down equipment.
Figure 14:
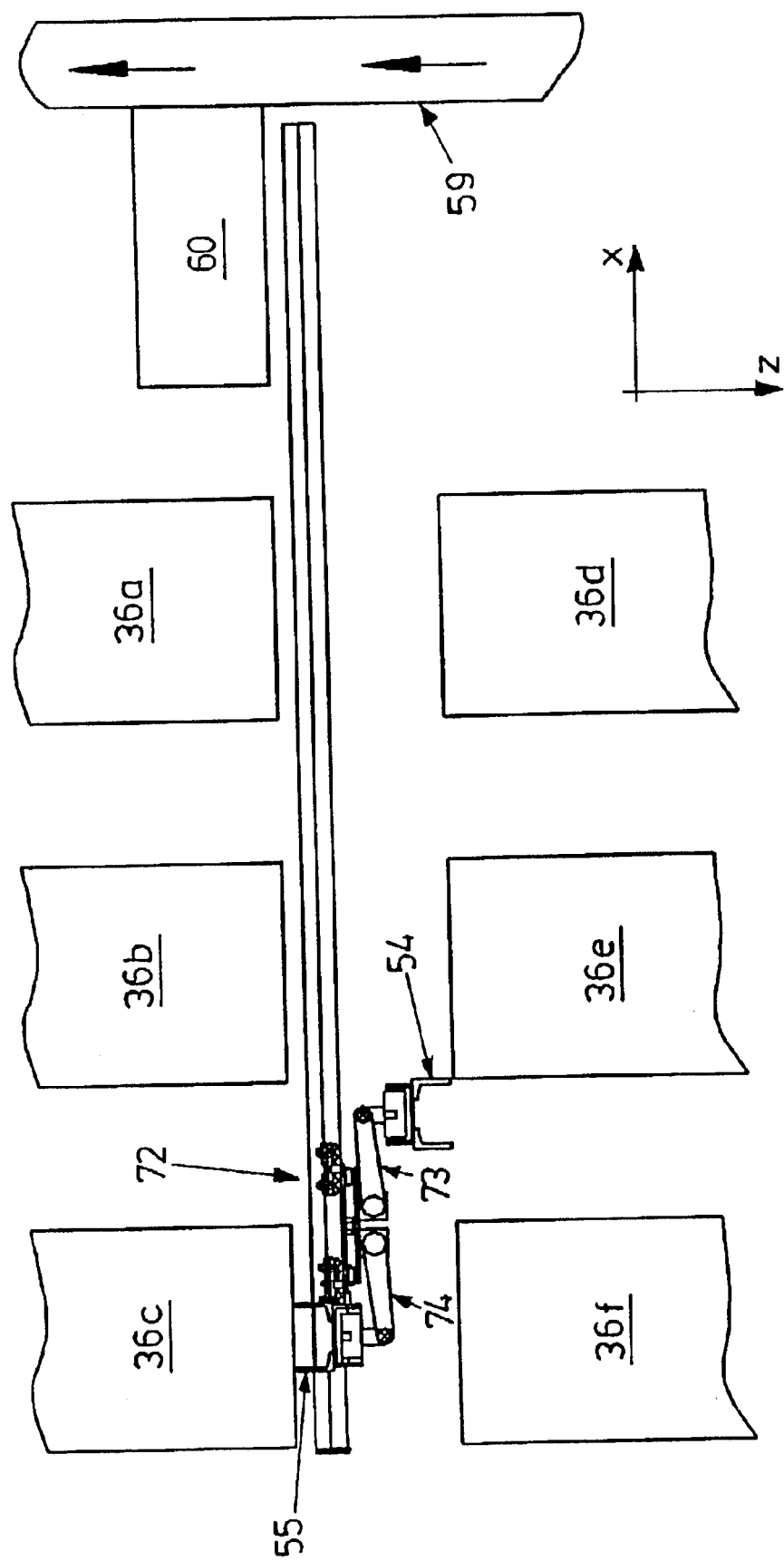
FIG. 14 is a perspective plan view of a diagrammatic illustration of an installation with several machine tools and a supply and take-down equipment.

In the embodiment according to FIGS. 13 and 14, components that are identical with or very similar to parts already described have the same reference numerals, there being no need of renewed description. The illustrated supply and take-down equipment 72 comprises z displacement means 73 and 74, which have a main pivoted lever 65 in the place of the parallel bars of FIG. 9. This main pivoted lever 65 is pivotably mounted on the y skid 47; it can be pivoted by the respective z pivot drive 69. The holder 70, which bears the respective work piece gripper 54 and 55, is connected to the main pivoted lever 65 by way of a guide driving motor 75, by means of which any motion of the gripper 54 and 55 about a pivot axis 76 in the y direction is possible.

As seen in FIG. 13 in combination with FIG. 14, this supply and take-down equipment 72 may also serve for operation of two rows of machine tools 36a to 36f that are opposite to one another. In this case, a gripper 55 can be used for operation of the row of machine tools 36a to 36c—at the top of FIG. 14—whereas the other gripper 54 serves for operation of the row of machine tools 36d to 36f—at the bottom of FIG. 14. Each of the grippers 54, 55 may just as well be used for only one respective row, there being nearly unlimited flexibility.

What is claimed is:

1. An installation for machining work pieces, comprising
   at least one machine tool, which has
   a machine bed,
   a frame joined to the machine bed,
   a work spindle, which, by means of a work spindle motion unit that is disposed on the frame, is movable on a plane spanned by a vertical x y direction and a horizontal x direction, and which is designed for holding a tool, and which extends perpendicularly to the plane in a z direction, a working area disposed on the machine bed before the work spindle in the z direction,
   and work piece holding means, which include chucking devices for a work piece and which are disposed in the working area; and
   at least one supply and take-down equipment;
   wherein the at least one supply and take-down equipment is disposed before the at least one machine tool and in the z direction before the side of the working area that faces away from the work spindle;
   in that disposed before the at least one machine tool is a conveyor path, which runs substantially in the x direction and on which the at least one supply and take-down equipment is displaceably supported;
   in that the at least one supply and take-down equipment has at least one work piece transfer means; and
   in that the at least one work piece transfer means and/or the work piece holding means is displaceable in the z direction for transfer of a work piece from the at least one work piece transfer means to the work piece holding means and vice versa; and
   in that the at least one work piece transfer means is pivotable about a center line that runs in the z direction.

2. An installation according to claim 1, wherein the work piece holding means as well as the at least one work piece transfer means are displaceable in the z direction.

3. An installation according to claim 1, wherein at least one the supply and take-down equipment comprises an x skid, which is movable on the conveyor path and is provided with at least a z-displacement means which is movable in the z direction and on which is mounted the at least one work piece transfer means.

4. An installation according to claim 1, wherein at least one the work piece transfer means is a work piece gripper.

5. An installation according to claim 1, wherein at least one the work piece transfer means is displaceable straightly in the z direction by a z skid.

6. An installation according to claim 1, wherein at least one the work piece transfer means is displaceable in the z direction by a pivoted lever which is drivable for pivoting.

7. An installation according to claim 1, wherein at least one machine tool comprises a plurality of machine tools are arranged side by side in a row; and in that the conveyor path runs in front of the plurality of machine tools.

8. An installation according to claim 1, wherein the at least one machine tool comprises a plurality of machine tools are arranged in two opposite rows; and in that the conveyor path runs between the two rows of machine tools.

9. An installation according to claim 1, wherein the at least one work piece transfer means comprises two work piece transfer means, which are disposed side by side in the x direction and actuated independently of one another.

10. An installation according to claim 1, wherein the at least one work piece transfer means is displaceable in the y direction.

11. An installation according to claim 1, wherein the at least one work piece transfer means comprises a gripper drive.

12. An installation according to claim 1, wherein the work piece holding means is suspended on a z skid that is disposed in the y direction above the work piece holding means.

13. An installation according to claim 1, wherein the work piece holding means is suspended on a work piece turntable, which is disposed in the y direction above the work piece holding means and rotary about an axis that runs in the y direction.

14. An installation for machining work pieces, comprising
    at least one machine tool, which has
    a machine bed,
    a frame joined to the machine bed,
    a work spindle, which, by means of a work spindle motion unit that is disposed on the frame, is movable on a plane spanned by a vertical y direction and a horizontal x direction, and which is designed for holding a tool, and which extends perpendicularly to the plane in a z direction,
    a working area disposed on the machine bed before the work spindle in the z direction,
    a machine frame defining the working area, and
    work piece holding means, which include chucking devices for a work piece and which are disposed in the working area; and
    at least one supply and take-down equipment;
    wherein the at least one supply and take-down equipment is disposed before the at least one machine tool and in the z direction before the side of the working area that faces away from the work spindle;
    wherein disposed before the at least one machine tool is a conveyor path, which runs substantially in the x direction and on which the at least one supply and take-down equipment is displaceably supported;
    wherein the at least one supply and take-down equipment has at least one work piece transfer means;
    wherein the work piece holding means is suspended on a z skid that is disposed in the y direction above the work piece holding means and which z skid is displaceable in the z direction on z guides mounted on the frame; and
    wherein the at least one work piece transfer means as well as the work piece holding means are linearly displaceable in the z direction for transfer of a work piece from the at least one work piece transfer means to the work piece holding means and vice versa.

15. An installation according to claim 14, wherein the at least one supply and take-down equipment comprises an x skid, which is movable on the conveyor path and is provided with at least a z-displacement means which is movable in the z direction and on which is mounted the at least one work piece transfer means.

16. An installation according to claim 14, wherein the at least one work piece transfer means is a work piece gripper.

17. An installation according to claim 14, wherein the at least one work piece transfer means is displaceable straightly in the z direction by a z skid.

18. An installation according to claim 14, wherein the at least one work piece transfer means is displaceable in the z direction by a pivoted lever which is drivable for pivoting.

19. An installation according to claim 14, wherein the at least one machine tool comprises a plurality of machine tools that are arranged side by side in a row; and wherein the conveyor path runs in front of the plurality of machine tools.

20. An installation according to claim 14, wherein the at least one machine tool comprises a plurality of machine tools that are arranged in two opposite rows; and wherein the conveyor path runs between the two rows of machine tools.

21. An installation according to claim 14, wherein the at least one work piece transfer mean comprises two work piece transfer means, which are disposed side by side in the x direction and actuated independently of one another.

22. An installation according to claim 14, wherein the at least one work piece transfer means is displaceable in the y direction.

23. An installation according to claim 14, wherein the at least one work piece transfer means comprises a gripper drive.

24. An installation according to claim 14, wherein the at least one work piece transfer means is pivotable about a center line that runs in the z direction.

25. An installation according to claim 14, wherein the work piece holding means is suspended on a work piece turntable suspended on the z skid, which is disposed in the y direction above the work piece holding means and rotary about an axis that runs in the y direction.

26. An installation for machining work pieces, comprising
   at least one machine tool, which has
      a machine bed,
      a frame joined to the machine bed,
      a work spindle, which, by means of a work spindle motion unit that is disposed on the frame, is movable on a plane spanned by a vertical y direction and a horizontal x direction, and which is designed for holding a tool, and which extends perpendicularly to the plane in a z direction,
      a working area disposed on the machine bed before the work spindle in the z direction,
      a machine frame defining the working area and
      work piece holding means, which include chucking devices for a work piece and which are disposed in the working area; and
   at least one supply and take-down equipment;
wherein the at least one supply and take-down equipment is disposed before the at least one machine tool and in the z direction before the side of the working area that faces away from the work spindle;
wherein disposed before the at least one machine tool is a conveyor path, which runs substantially in the x direction and on which the at least one supply and take-down equipment is displaceably supported;
wherein the at least one supply and take-down equipment has at least a work piece transfer means; and
wherein the at least one work piece transfer means and/or the work piece holding means is displaceable in the z direction for transfer of a work piece from the at least one work piece transfer means to the work piece holding means and vice versa; and
wherein the at least one work piece transfer means is displaceable in the z direction by a main pivoted lever which is drivable for pivoting about a vertical pivot axis that runs in the y direction and by a parallel-motion lever, whereby the pivoted lever and the parallel-motion lever form parallel bars.

27. An installation according to claim 26, wherein the work piece holding means as well as the at least one work piece transfer means are displaceable in the z direction.

28. An installation according to claim 26, wherein the at least one supply and take-down equipment comprises an x skid, which is movable on the conveyor path and is provided with at least a z-displacement means which is movable in the z direction and on which is mounted the at least one work piece transfer means.

29. An installation according to claim 26, wherein the at least one work piece transfer means is a work piece gripper.

30. An installation according to claim 26, wherein the at least one machine tool comprises a plurality of machine tools that are arranged side by side in a row; and wherein the conveyor path runs in front of the plurality of machine tools.

31. An installation according to claim 26, wherein the at least one machine tool comprises a plurality of machine tools that are arranged in two opposite rows; and wherein the conveyor path runs between the two rows of machine tools.

32. An installation according to claim 26, wherein the at least one work piece transfer means comprises two work piece transfer means which are disposed side by side in the x direction and actuated independently of one another.

33. An installation according to claim 26, wherein the at least one work piece transfer means is displaceable in the y direction.

34. An installation according to claim 26, wherein the at least one work piece transfer means comprises a gripper drive.

35. An installation according to claim 26, wherein the at least one work piece transfer means is pivotable about a center line that runs in the z direction.

36. An installation according to claim 26, wherein the work piece holding means is suspended on a z skid that is disposed in the y direction above the work piece holding means.

37. An installation according to claim 26, wherein the work piece holding means is suspended on a work piece turntable, which is disposed in the y direction above the work piece holding means and rotary about an axis that runs in the y direction.

38. An installation for machining work pieces, comprising
   at least one machine tool, which has
      a machine bed,
      a frame joined to the machine bed,
      a work spindle, which, by means of a work spindle motion unit that is disposed on the frame, is movable on a plane spanned by a vertical y direction and a horizontal x direction, and which is designed for holding a tool, and which extends perpendicularly to the plane in a z direction,
      a working area disposed on the machine bed before the work spindle in the z direction,
      a machine frame defining the working area and
      work piece holding means, which include chucking devices for a work piece and which are disposed in the working area; and
   at least one supply and take-down equipment;
wherein the at least one supply and take-down equipment is disposed before the at least one machine tool and in the z direction before the side of the working area that faces away from the work spindle;
wherein disposed before the at least one machine tool is a conveyor path, which runs substantially in the x direction and on which the at least one supply and take-down equipment is displaceably supported;
wherein the at least one supply and take-down equipment has at least a work piece transfer means; and
wherein the at least one work piece transfer means and/or the work piece holding means is displaceable in the z direction for transfer of a work piece from the at least one work piece transfer means to the work piece holding means and vice versa; and
wherein the at least one work piece transfer means is displaceable in the z direction by a main pivoted lever which is drivable for pivoting about a vertical pivot axis that runs in the y direction and by a guide driving motor which is arranged between the at least one work piece transfer means and the main pivoted lever.

39. An installation according to claim 38, wherein the work piece holding means as well as the at least one work piece transfer means are displaceable in the z direction.

40. An installation according to claim 38, wherein the at least one supply and take-down equipment comprises an x skid, which is movable on the conveyor path and is provided with at least a z-displacement means which is movable in the z direction and on which is mounted the at least one work piece transfer means.

41. An installation according to claim 38, wherein the at least one work piece transfer means is a work piece gripper.

42. An installation according to claim 38, wherein the at least one machine tool comprises a plurality of machine tools that are arranged side by side in a row; and wherein the conveyor path runs in front of the plurality of machine tools.

43. An installation according to claim 38, wherein the at least one machine tool comprises a plurality of machine tools that are arranged in two opposite rows; and wherein the conveyor path runs between the two rows of machine tools.

44. An installation according to claim 38, wherein the at least one work piece transfer means comprises two work piece transfer means, which are disposed side by side in the x direction and actuated independently of one another.

45. An installation according to claim 38, wherein the at least one work piece transfer means is displaceable in the y direction.

46. An installation according to claim 38, wherein the at least one work piece transfer means comprises a gripper drive.

47. An installation according to claim 38, wherein the at least one work piece transfer means is pivotable about a center line that runs in the z direction.

48. An installation according to claim 38, wherein the work piece holding means is suspended on a z skid that is disposed in the y direction above the work piece holding means.

49. An installation according to claim 38, wherein the work piece holding means is suspended on a work piece turntable, which is disposed in the y direction above the work piece holding means and rotary about an axis that runs in the y direction.

* * * * *